United States Patent
Shmouely et al.

(10) Patent No.: US 8,644,623 B2
(45) Date of Patent: Feb. 4, 2014

(54) MEASURING WEB PAGE RENDERING TIME

(75) Inventors: Meir Shmouely, Kirkland, WA (US);
Omer Rosenbaum, Kirkland, WA (US);
Gregory Bershansky, Sammamish, WA (US); Yuval Peled, Seattle, WA (US); M. David Fields, Kirkland, WA (US); Cenk Ergan, Bellevue, WA (US); Michael D. Decker, Bellevue, WA (US); Aaron Rodriguez Hernandez, Sammamish, WA (US); Matthew P. Kotsenas, Seattle, WA (US); Jason J. Weber, Medina, WA (US); Yi Ming Zhou, Bellevue, WA (US); Kieran Chin Cheong, Seattle, WA (US); Kelly Laurence Ford, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 95 days.

(21) Appl. No.: 13/298,219

(22) Filed: Nov. 16, 2011

(65) Prior Publication Data

US 2013/0121599 A1    May 16, 2013

(51) Int. Cl.
*G06K 9/68*    (2006.01)

(52) U.S. Cl.
USPC .......................................................... 382/219

(58) Field of Classification Search
USPC ............... 382/103, 181, 219, 284, 311
See application file for complete search history.

(56) References Cited

U.S. PATENT DOCUMENTS

| | | | |
|---|---|---|---|
| 6,567,103 B1 * | 5/2003 | Chaudhry | 715/738 |
| 6,763,386 B2 * | 7/2004 | Davis et al. | 709/224 |
| 7,216,168 B2 | 5/2007 | Merriam | |
| 7,423,653 B2 * | 9/2008 | Gettman et al. | 345/587 |
| 7,475,067 B2 | 1/2009 | Clary et al. | |
| 7,870,254 B2 | 1/2011 | Allan | |
| 8,453,190 B2 * | 5/2013 | Liwerant et al. | 725/115 |
| 2002/0169868 A1 | 11/2002 | Lopke et al. | |
| 2004/0221034 A1 | 11/2004 | Kausik et al. | |
| 2007/0118640 A1 | 5/2007 | Subramanian et al. | |
| 2007/0226058 A1 * | 9/2007 | Lorenzen et al. | 705/14 |
| 2009/0172703 A1 | 7/2009 | Nakano et al. | |
| 2009/0259927 A1 * | 10/2009 | Fisher | 715/205 |
| 2010/0005403 A1 * | 1/2010 | Rozmaryn et al. | 715/760 |
| 2010/0125660 A1 | 5/2010 | Murakami | |
| 2010/0223322 A1 * | 9/2010 | Mott et al. | 709/203 |
| 2011/0029641 A1 | 2/2011 | Fainberg et al. | |
| 2011/0119370 A1 | 5/2011 | Huang et al. | |
| 2011/0137737 A1 | 6/2011 | Baird et al. | |

(Continued)

OTHER PUBLICATIONS

"Above-the-fold time (AFT): Useful, but not yet a substitute for user-centric analysis", Retrieved at <<http://www.webperformancetoday.com/2011/03/16/above-the-fold-time-web-performance-measurement>>, Mar. 16, 2011, pp. 7.

(Continued)

*Primary Examiner* — Daniel Mariam
(74) *Attorney, Agent, or Firm* — Wolfe-SBMC

(57) ABSTRACT

Various embodiments provide approaches for measuring the rendering times of a webpage that can be browser-independent. In at least some embodiments, as a web page is rendered, video data of the webpage is captured and analyzed to ascertain when the webpage, or portions thereof, have likely been completely rendered. In at least some embodiments, image processing can be performed on captured video data to ascertain, from observed pixel changes over time, when the webpage has likely been rendered.

20 Claims, 10 Drawing Sheets

(56) References Cited

U.S. PATENT DOCUMENTS

| | | |
|---|---|---|
| 2011/0150433 A1 | 6/2011 | Alexandrov et al. |
| 2012/0197711 A1* | 8/2012 | Zhou et al. .................. 705/14.41 |
| 2012/0317271 A1* | 12/2012 | Funk et al. .................... 709/224 |
| 2013/0027408 A1* | 1/2013 | Garg ............................ 345/473 |
| 2013/0063362 A1* | 3/2013 | Papakipos et al. ............ 345/173 |

OTHER PUBLICATIONS

"International Search Report", Mailed Date: Apr. 29, 2013, Application No. PCT/US2012/065464, Filed Date: Nov. 16, 2012, pp. 9.

* cited by examiner

MEASURING WEB PAGE RENDERING TIME

BACKGROUND

Web page load time, as perceived by the end user, has been shown to be a major driving factor for user engagement. This, in turn, has proven to be a desired indicator of user loyalty and website revenue from advertising. However, measuring the user-perceived webpage load time has proven a complex task. Although techniques do exist to measure web page load time, such techniques tend to focus on network activity, such as network traffic or utilize browser plug-ins which can add delays and degrade web page loading. These techniques, however, provide only a rough approximation of load times and fail to measure the actual content being rendered on the screen which, by definition, is what the user sees on the screen during page loading.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Various embodiments provide approaches for measuring the rendering times of a webpage that can be browser-independent. In at least some embodiments, as a web page is rendered, video data of the webpage is captured and analyzed to ascertain when the webpage has likely been completely rendered. In at least some embodiments, image processing can be performed on captured video data to ascertain, from observed pixel changes over time, when the webpage has likely been rendered.

In at least some embodiments, rendering times associated with an entire page can be ascertained through the described analysis techniques. Alternately or additionally, rendering times associated with sub-regions of a particular page can be ascertained through the described analysis techniques. In some instances, regions that are not of interest can be masked or ignored.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Various embodiments provide approaches for measuring the rendering times of a webpage that can be browser-independent. In at least some embodiments, as a web page is rendered, video data of the webpage is captured and analyzed to ascertain when the webpage has likely been completely rendered. In at least some embodiments, image processing can be performed on captured video data to ascertain, from observed pixel changes over time, when the webpage has likely been rendered.

In at least some embodiments, rendering times associated with an entire page can be ascertained through the described analysis techniques. Alternately or additionally, rendering times associated with sub-regions of a particular page can be ascertained through the described analysis techniques. In some instances, regions that are not of interest can be masked or ignored.

The various embodiments can enable rendering time, as between different web browsers, to be compared and analyzed. In addition, rendering times between different websites can be analyzed and compared in the same manner that a user would compare them. In this case, quantitative data, such as a time-based rendering metric, can be developed to quantify the user's visual experience insofar as web page load time is concerned.

In the following discussion, an example environment is first described that is operable to employ the techniques described herein. Example illustrations of the various embodiments are then described, which may be employed in the example environment, as well as in other environments. Accordingly, the example environment is not limited to performing the described embodiments and the described embodiments are not limited to implementation in the example environment.

Example Operating Environment

Figure 1:
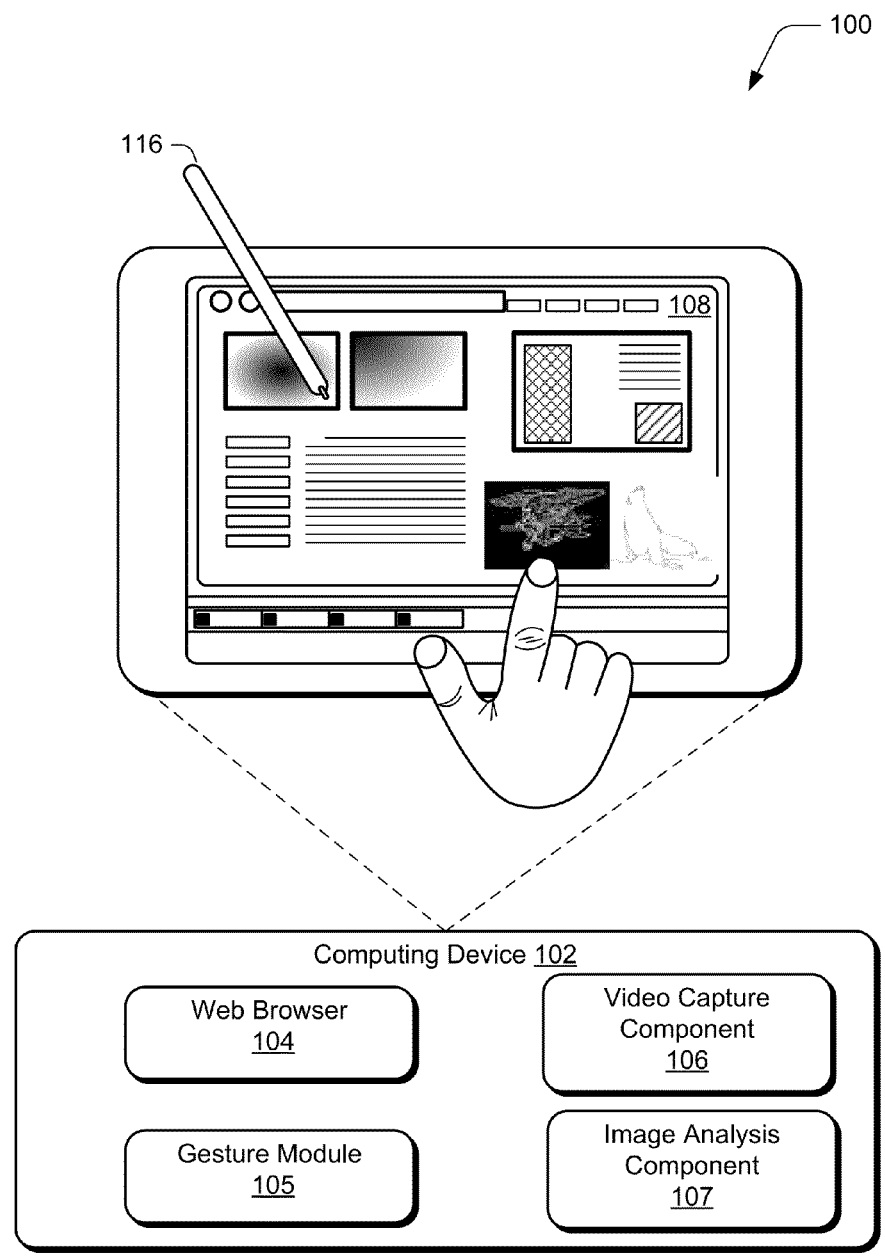
FIG. 1 is an illustration of an environment in an example implementation in accordance with one or more embodiments.

FIG. 1 is an illustration of an environment 100 in an example implementation that is operable to employ the animation techniques described in this document. The illustrated environment 100 includes an example of a computing device 102 that may be configured in a variety of ways. For example, the computing device 102 may be configured as a traditional computer (e.g., a desktop personal computer, laptop computer, and so on), a mobile station, an entertainment appliance, a set-top box communicatively coupled to a television, a wireless phone, a netbook, a game console, a handheld device, and so forth as further described in relation to FIG. 2. Thus, the computing device 102 may range from full resource devices with substantial memory and processor resources (e.g., personal computers, game consoles) to a low-resource device with limited memory and/or processing resources (e.g., traditional set-top boxes, hand-held game consoles). The computing device 102 also includes software that causes the computing device 102 to perform one or more operations as described below.

Computing device 102 includes, among other components, a web browser 104, a gesture module 106, a video capture component 106, and an image analysis component 107.

Web browser 104 is representative of functionality that enables web pages to be retrieved and rendered on the computing device 102 via display device 108. Any suitable type of web browser can be employed, examples of which are available from the assignee of this document, as well as others.

Gesture module 105 is representative of functionality that recognizes gestures that can be performed by one or more fingers, and causes operations to be performed that correspond to the gestures. The gestures may be recognized by module 105 in a variety of different ways. For example, the gesture module 105 may be configured to recognize a touch input, such as a finger of a user's hand, as proximal to display device 108 of the computing device 102 using touchscreen functionality. Module 105 can be utilized to recognize single-finger gestures and bezel gestures, multiple-finger/same-hand gestures and bezel gestures, and/or multiple-finger/different-hand gestures and bezel gestures.

The computing device 102 may also be configured to detect and differentiate between a touch input (e.g., provided by one or more fingers of the user's hand) and a stylus input (e.g., provided by a stylus 116). The differentiation may be performed in a variety of ways, such as by detecting an amount of the display device 108 that is contacted by the finger of the user's hand versus an amount of the display device 108 that is contacted by the stylus 116.

Thus, the gesture module 105 may support a variety of different gesture techniques through recognition and leverage of a division between stylus and touch inputs, as well as different types of touch inputs.

Video capture component 106 is representative of functionality that enables video data associated with the webpage to be captured when the web page is rendered by the web browser 104. Video data associated with an entire display screen can be captured. Alternately or additionally, the video data associated with a portion of the webpage constituting less than an entirety of the webpage can be captured and analyzed. In the illustrated and described embodiment, when the video capture component 106 captures screen data associated with rendering of a web page, such can be saved into a digital video file for further processing. In addition, in at least some embodiments, the video capture component 106 is configured to enable the video data to be marked in some way to facilitate image analysis, examples of which are provided below.

Image analysis component 107 is representative of functionality that enables video data captured by the video capture component 106 to be analyzed and for a time-based metric to be computed for at least a portion of the web page. In one or more embodiments, the image analysis component 107 is configured to read the video file and analyze visual characteristics of the video file to compute the time-based rendering metric. In at least some embodiments, analysis takes place on a frame-by-frame basis, as will become apparent below. In addition, in at least some embodiments, the image analysis component 107 is configured to conduct analysis on the video data captured by the image analysis component 107 on a pixel-by-pixel basis.

It is to be appreciated and understood that while the video capture component 106 and the image analysis component 107 are shown as comprising part of computing device 102, such components can be implemented as standalone components independent of computing device 102.

Collectively, the video capture component 106 and image analysis component 107 enable rendering times, i.e. time-based rendering metrics, associated with a webpage rendered by web browser to be measured in a browser-independent manner. As a web page is rendered by the web browser 104, video data of the webpage is captured by the video capture component 106. The video data can then be analyzed by the image analysis component 107 to ascertain when the webpage has likely been completely rendered. In at least some embodiments, image processing can be performed on captured video data to ascertain, from observed pixel changes over time, when the webpage has likely been rendered.

In at least some embodiments, rendering times associated with an entire page can be ascertained through the described analysis techniques. Alternately or additionally, rendering times associated with sub-regions of a particular page can be ascertained through the described analysis techniques. In some instances, regions that are not of interest can be masked or ignored.

Figure 2:
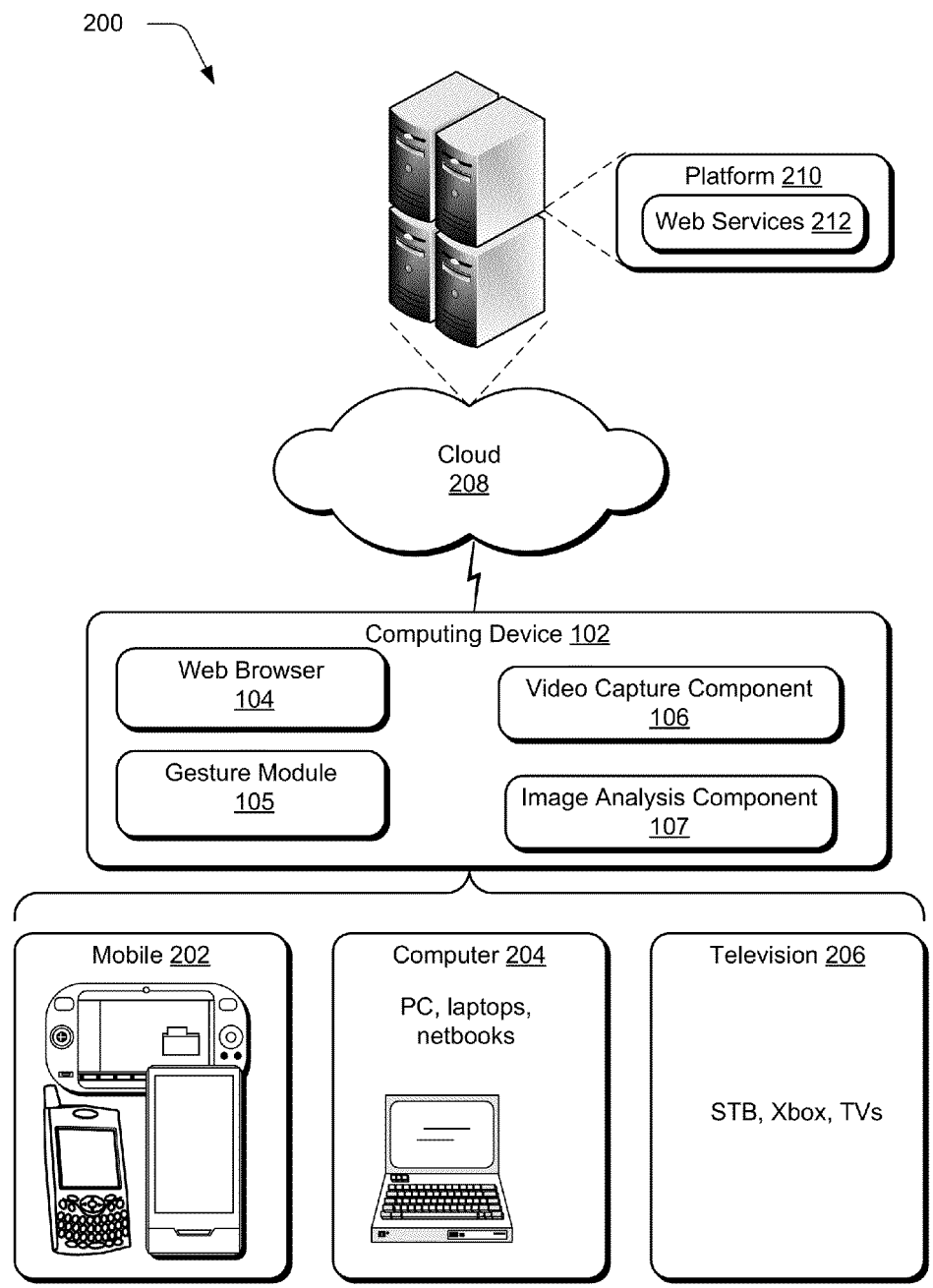
FIG. 2 is an illustration of a system in an example implementation showing FIG. 1 in greater detail.

FIG. 2 illustrates an example system 200 showing the web browser 104, gesture module 105, video capture component 106, and image analysis component 107 as being implemented in an environment where multiple devices are interconnected through a central computing device. The central computing device may be local to the multiple devices or may be located remotely from the multiple devices. In one embodiment, the central computing device is a "cloud" server farm, which comprises one or more server computers that are connected to the multiple devices through a network or the Internet or other means.

In one embodiment, this interconnection architecture enables functionality to be delivered across multiple devices to provide a common and seamless experience to the user of the multiple devices. Each of the multiple devices may have different physical requirements and capabilities, and the central computing device uses a platform to enable the delivery of an experience to the device that is both tailored to the device and yet common to all devices. In one embodiment, a "class" of target device is created and experiences are tailored to the generic class of devices. A class of device may be defined by physical features or usage or other common characteristics of the devices. For example, as previously described the computing device 102 may be configured in a variety of different ways, such as for mobile 202, computer 204, and television 206 uses. Each of these configurations has a generally corresponding screen size and thus the computing device 102 may be configured as one of these device classes in this example system 200. For instance, the computing device 102 may assume the mobile 202 class of device which includes mobile telephones, music players, game devices, and so on. The computing device 102 may also assume a computer 204 class of device that includes personal computers, laptop computers, netbooks, and so on. The television 206 configuration includes configurations of device that involve display in a casual environment, e.g., televisions, set-top boxes, game consoles, and so on. Thus, the techniques described herein may be supported by these various configurations of the computing device 102 and are not limited to the specific examples described in the following sections.

Cloud 208 is illustrated as including a platform 210 for web services 212. The platform 210 abstracts underlying functionality of hardware (e.g., servers) and software resources of the cloud 208 and thus may act as a "cloud operating system." For example, the platform 210 may abstract resources to connect the computing device 102 with other computing devices. The platform 210 may also serve to abstract scaling of resources to provide a corresponding level of scale to encountered demand for the web services 212 that are implemented via the platform 210. A variety of other examples are also contemplated, such as load balancing of servers in a server farm, protection against malicious parties (e.g., spam, viruses, and other malware), and so on.

Thus, the cloud 208 is included as a part of the strategy that pertains to software and hardware resources that are made available to the computing device 102 via the Internet or other networks. For example, the image analysis component 107 may be implemented in part on the computing device 102 as well as via a platform 210 that supports web services 212.

The gesture techniques supported by the gesture module may be detected using touchscreen functionality in the mobile configuration 202, track pad functionality of the computer 204 configuration, detected by a camera as part of support of a natural user interface (NUI) that does not involve contact with a specific input device, and so on. Further, performance of the operations to detect and recognize the inputs to identify a particular gesture may be distributed throughout the system 200, such as by the computing device 102 and/or the web services 212 supported by the platform 210 of the cloud 208.

Generally, any of the functions described herein can be implemented using software, firmware, hardware (e.g., fixed logic circuitry), manual processing, or a combination of these implementations. The terms "module," "functionality," and "logic" as used herein generally represent software, firmware, hardware, or a combination thereof. In the case of a software implementation, the module, functionality, or logic represents program code that performs specified tasks when executed on or by a processor (e.g., CPU or CPUs). The program code can be stored in one or more computer readable memory devices. The features of the gesture techniques described below are platform-independent, meaning that the techniques may be implemented on a variety of commercial computing platforms having a variety of processors.

In the discussion that follows, various sections describe various example embodiments. A section entitled "Example Embodiment" describes various aspects of a video capture phase and an image analysis phase in accordance with one or more embodiments. Next, a section entitled "Example Methods" describes example methods in accordance with one or more embodiments. Last, a section entitled "Example Device" describes aspects of an example device that can be utilized to implement one or more embodiments.

Having described example operating environments in which the web page rendering times can be measured, consider now a discussion of an example video capture and image analysis in accordance with one or more embodiments.

Example Embodiment

In one or more embodiments, web page rendering times can be ascertained using a video capture phase, followed by an image analysis phase. In the illustrated and described embodiment, the video capture phase can be performed by a video capture component such as video capture component 106. The image analysis phase can be performed by an image analysis component such as image analysis component 107.

Video Capture Phase

With respect to the video capture phase, consider the following. In one or more embodiments, initiation of the video capture phase can occur prior to, or responsive to a navigation to a webpage. For example, in at least some embodiments video capture can be initiated manually, followed by a manual or automatic navigation to a webpage. In this instance, a human evaluator may launch the video capture component and then initiate navigation to a webpage. In other embodiments, an automated test system may initiate video capture in connection with an automated navigation to a webpage.

In one or more embodiments, when navigation has been initiated and video capture has begun, the video data can be marked in some way to delineate the start the navigation activity. Marking of the video data can occur in any suitable way. For example, in at least some embodiments, a suitable mark, such as a visual identifier, can be produced on the display device or screen to signal that the navigation has begun. Any suitable mark can be utilized. As but one example, consider FIG. 3. There, display device 108 of computing device 102 includes a mark 300 in the lower left corner. This mark is captured, along with the video data describing the navigation to the webpage. Alternately or additionally, the video data can be marked using a timestamp or some other suitable type of metadata included along with the video data. The mark or identifier may be visual or non-visual.

Figure 3:
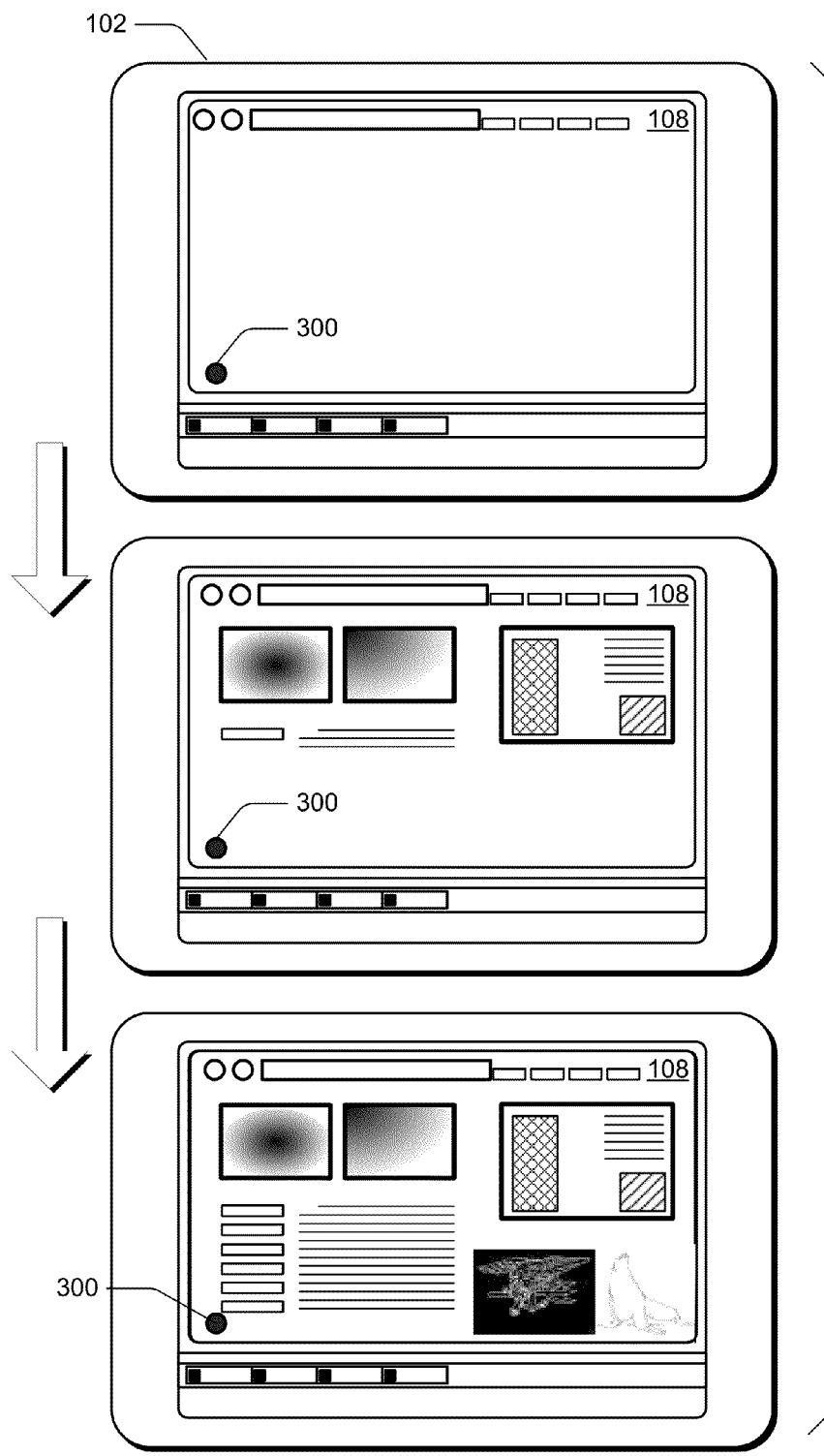
FIG. 3 illustrates a web page rendering in accordance with one or more embodiments.

After the web page has been rendered (diagrammatically indicated by progressing visually along the arrows in FIG. 3 toward the bottom figure), video capture can be terminated. Termination of the video capture can occur in any suitable way. For example, in at least some embodiments, termination of video capture can occur after a predefined time window, e.g. 10 seconds. Alternately, termination of video capture can occur using cues derived from network traffic. For example, the video capture component can consider the last byte received in addition to a predefined time buffer, such as by considering when all files have been downloaded and adding an amount of time after which video capture is terminated. These and other techniques can be utilized to terminate video capture to ensure that a complete rendering has, or likely has taken place. In at least some embodiments, these termination techniques can "overshoot" the completion of web page rendering to ensure that adequate video data is captured.

Once the video data has been captured, as described above, image analysis of the video data can take place, as described below.

Image Analysis Phase

With respect to the image analysis phase, consider the following. In at least some embodiments, once the video data has been captured, regions of interest can be identified for purpose of further analysis. This can be performed in any suitable way. For example, in at least some embodiments, video associated with the video data can be loaded and the start frame can be identified. Any suitable method can be utilized to identify the start frame. For example, in at least some embodiments, the start frame can be identified by locating the frame at which a visual indicator, such as that described above, first appears. Alternately or additionally, a frame associated with a particular timestamp can be located.

Next, the associated video can be forwarded to a frame that represents a completed render state. Any suitable technique can be utilized to identify this frame. For example, the frame representing the completed render state might be a frame that occurs at the particular pre-defined time after the start frame. Alternately or additionally, this frame might occur in connection with the occurrence of a particular event, such as the last byte received, and the like.

Figure 4:
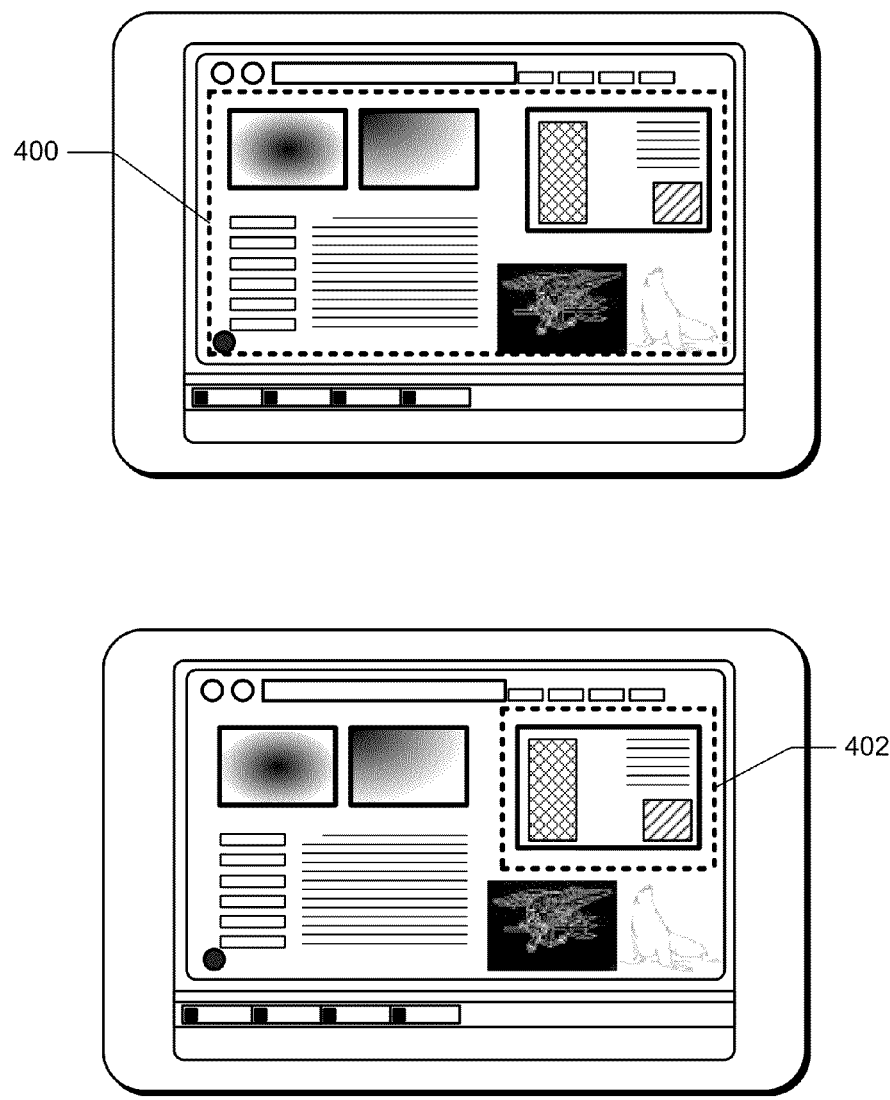
FIG. 4 illustrates regions of interest in accordance with one or more embodiments.

Once the collection of frames that constitutes a completed rendering state has been selected, regions of interest can be marked for subsequent analysis. In at least some embodiments this can include or be performed by a manual process such as, by way of example and not limitation, using an input device to mark regions directly on the video. Alternately or additionally, an automated approach can be utilized to identify one or more regions of interest. For example, image recognition can be utilized to identify these regions. Alternately, metadata such as that found in an associated Document Object Model of a website can identify hints or tags of different regions. Each region of interest can then be named and saved in a configuration file so that image analysis can be performed on the recorded video data. As an example, consider FIG. 4.

There, two separate regions of interest have been identified. A first region of interest 400 includes the entire visible screen, thus encapsulating all visible content. Alternately, a second region of interest 402 includes a sub-region that encapsulates a sub-portion of the visible content. In this example, region of interest 402 might include an advertisement or a multi-media video.

Having designated a region or regions of interest, image processing can now take place to measure the rendering time associated with a particular webpage and the region or regions of interest that have been designated.

Initially, the video associated with the video data is loaded and the image analysis component can seek to the start frame of the video. The start frame was previously identified or marked as described above. This start frame can now be designated as a baseline image for comparison with subsequent frames. Once the start frame is designated as the baseline image, subsequent frames can be compared to the start frame for purposes of computing a time-based rendering metric associated with rendering the web page. Any suitable algorithm can be used for purposes of comparing a current frame with the start frame. Such algorithms can include, by way of example and not limitation, those that employ histograms, difference percentages, number of non-white pixels divided by the area, optical character recognition (OCR) techniques, and the like. Such algorithms can be employed to effect a comparison on a pixel-by-pixel basis or to compare a summarization of pixels of a region.

For each frame analyzed, the timestamp associated with the frame and its associated computed difference value can be logged. The computed difference value is the value is computed based upon the analysis algorithm that is utilized to compare the frames. Once all of the frames have been analyzed and their timestamps and associated difference values have been logged, the data can be processed to extract the render time of the page or page portion.

Specifically, the processing described above enables data to be developed that describes the number of pixels associated with a rendering web page, or portion thereof, that change over time. Effectively, any particular rendering webpage (or portion thereof) will have a pattern that can be defined in terms of pixel changes over time. This pattern can and will change depending on the nature of content being rendered. For example, a web page with static content will have a different pattern than a webpage that includes animations. Similarly, a web page with one animation will likely have a different pattern than a web page with a large number of animations. Likewise, portions of web pages that are designated as regions of interest will have different patterns depending on the content that is rendered within particular portions.

Figure 5:
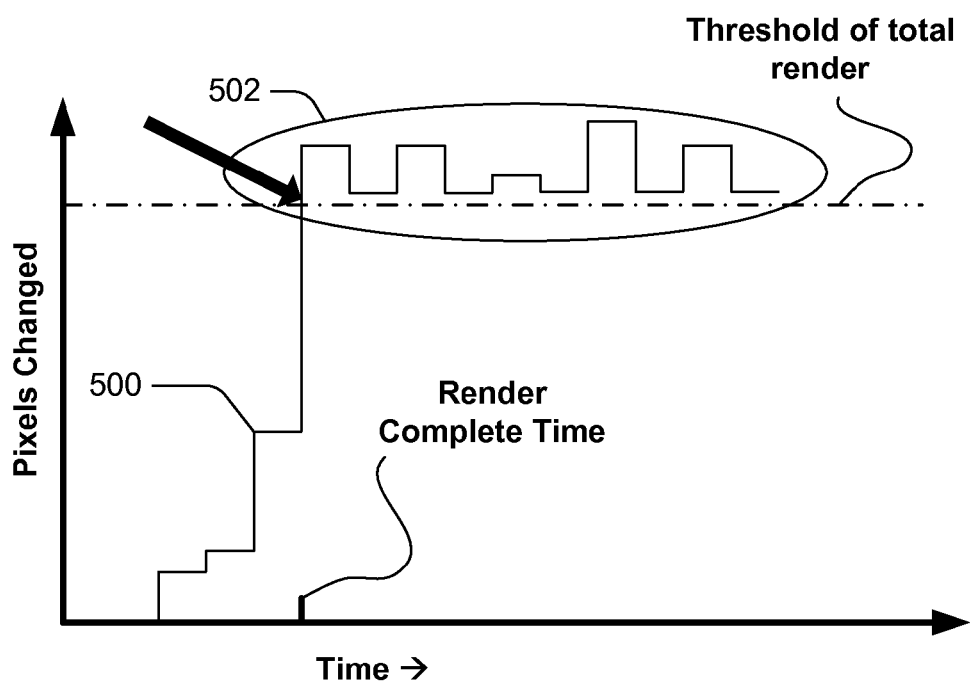
FIGS. 5-7 illustrate graphs of "pixels changed" over time in accordance with one or more embodiments.

Any particular pattern will, however, have a pattern region that is indicative of a completed rendering state. By identifying this particular pattern region, the time associated with the completed rendering state can be ascertained to provide an accurate measure of the time utilized to fully render the web page or web page portion. As an example, consider FIG. 5.

There, a graph of "pixels changed" over time is shown in conjunction with a pattern 500 that illustrates how an associated webpage's pixels have changed over time during rendering. Notice that a "threshold of total render" has been set at a particular number of pixels, e.g., 90% of pixels.

Figure 6:
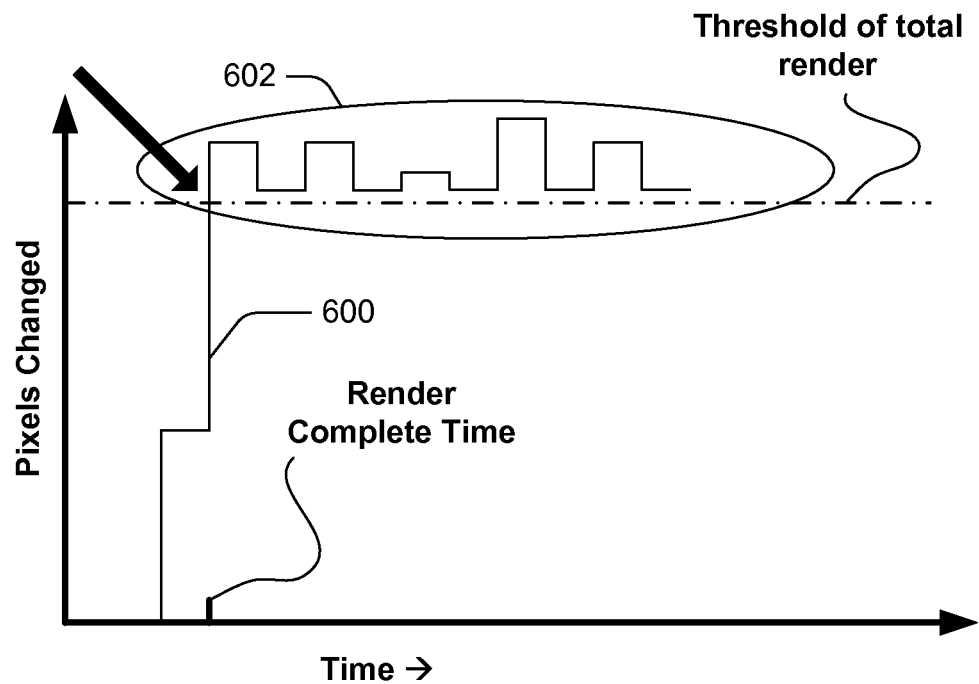

In this particular example, the webpage associated with pattern 500 includes a component that constantly changes. For example, such component may comprise an advertisement with moving audio/visual content. Each of the steps in pattern 500 represents a change in pixels relative to time. In this example, the page is rendering incrementally with individual elements being serially rendered. The first step (on the far left) in pattern 500 constitutes the time of first render when the content rendering process begins to cause changes in the associated pixels. As a pattern progresses, it crosses the threshold of total render. Above this threshold the page continues to change over time due to the changing audio/visual content. If enough of pattern 500 is recorded after the page has stabilized, as by crossing the threshold of total render, a pattern region can be identified and the time at which the pattern region started can be identified. This pattern region start time can then be selected as the time at which the web page rendering was likely complete. For example, the pattern region corresponding to the video or advertisement is shown at 502. The start point of the pattern is identified by the arrow which, in turn, defines the "render complete time" as indicated. As another example, consider FIG. 6.

Figure 7:
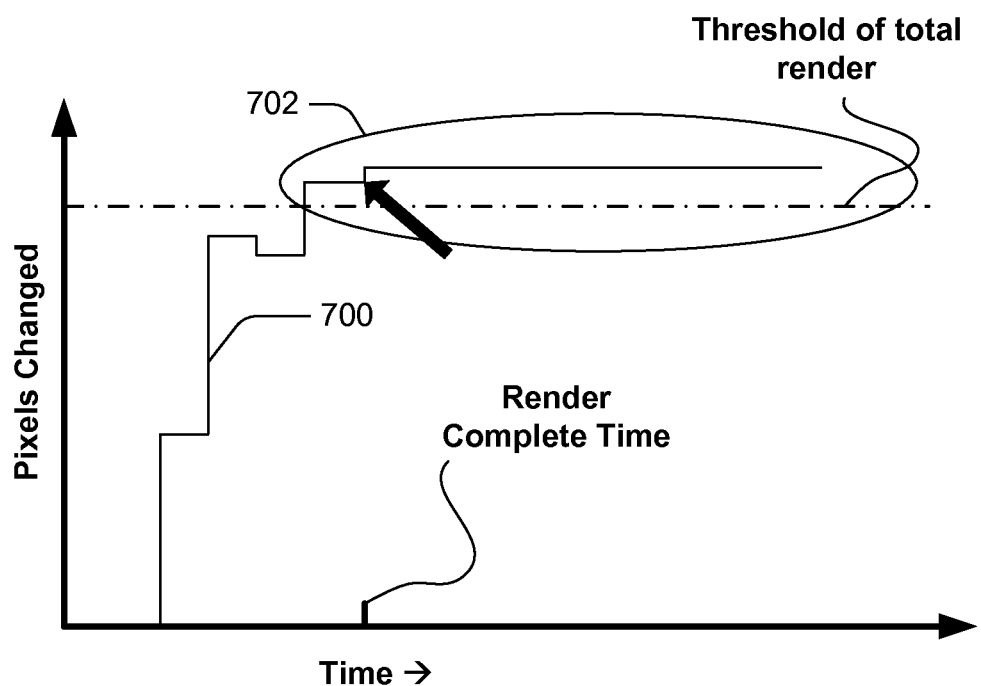

There, the graph of "pixels changed" over time is shown for a pattern 600 that represents a page with a sudden, large change in color during rendering. For example, the background color of the page could change suddenly indicating a fully-rendered page. This is represented by the large second step in the figure that crosses the threshold of total render. In this particular example, after the large change in color, the webpage associated with pattern 600 includes a component that constantly changes. For example, such component may comprise an advertisement with the moving audio/visual content. This defines a pattern region 602 whose start time can be identified. Like before, this pattern region start time can then be selected as the time at which the web page rendering was likely complete. The start point of the pattern region 602 is identified by the arrow which, in turn, defines the "render complete time" as indicated. As a further example, consider FIG. 7.

There, the graph of "pixels changed" over time is shown for a pattern 700 that represents a page that has content including text. In this example, the non-textual content of the page has been rendered in a manner that caused the pattern to initially cross the threshold of total render. However, in this example, the text has not yet been rendered. Thus, turning to pattern region 702, at the crossing of the threshold the text has not yet been rendered. The next step in the pattern, identified by the arrow, constitutes a text draw event. At this point, the start point of the pattern region 702 is identified by the arrow (corresponding to the text draw event) which, in turn, defines the "render complete time" as indicated. This example illustrates that an initial crossing of the threshold of total render may not necessarily indicate the render complete time. Rather, by analyzing the various pattern regions in the context of the content that is actually rendering, the likely render complete times can be ascertained.

Having considered various examples in which rendering times associated with web pages or regions of interest within web pages can be computed in accordance with one or more embodiments, consider now a discussion of example methods in accordance with one or more embodiments.

Example Methods

Figure 8:
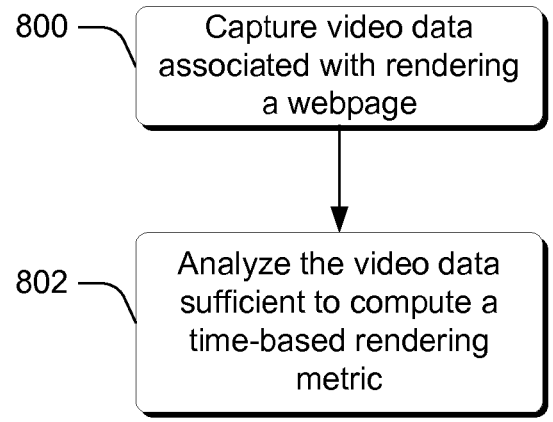
FIG. 8 is a flow diagram that describes steps in a method in accordance with one or more embodiments.

FIG. 8 is a flow diagram that describes steps in a method accordance with one or more embodiments. The method can be performed in connection with any suitable hardware, software, firmware, or combination thereof. In at least some embodiments, the method can be performed by software embodied on some type of computer-readable storage medium. One example of software that can perform the functionality about to be described includes a video capture component and image analysis component, such as that described above.

Step 800 captures video data associated with rendering a webpage on a display device. This step can be performed in any suitable way. For example, in at least some embodiments, video data is captured and an identifier, associated with the video data, is provided and identifies when navigation to a particular webpage appears to begin. Examples of suitable identifiers are provided above. For example, in at least some embodiments an identifier can reside in the form of a visual identifier. Alternately or additionally, an identifier can reside in the form of a non-visual identifier such as, by way of example and not limitation, a timestamp.

Step 802 analyzes the video data sufficient to compute a time-based rendering metric associated with rendering at least a portion of the webpage. This step can be performed in any suitable way. For example, in at least some embodiments, analysis can take place on a frame-by-frame basis. In some instances, frame-by-frame analysis can include designating a start frame of the video data and using the start frame as a baseline image for difference comparison of subsequent frames. The difference comparison can be conducted on a screen-basis in which all of the visible content on the screen or display device is analyzed. Thus, in these instances, the time-based rendering metric can be associated with an attempt to identify when the webpage is fully rendered. Alternately or additionally, difference comparison can be conducted on a portion of the webpage constituting less than an entirety of the webpage. Thus, in these instances, the time-based rendering metric can be associated with an attempt to identify when a portion of the webpage constituting less than an entirety of the webpage is fully rendered. Examples of how this can be done are provided above. In one or more embodiments, information in addition to the time-based rendering metric can be used to attempt to identify web a web page or portions thereof is loaded or partially loaded. For example, system resource utilization can be analyzed and used, together with the time-based rendering metric to attempt to identify when the webpage is loaded. System resource utilization can include, by way of example and not limitation, update frequency of an associated display device or graphics processor unit (GPU), CPU activity, and the like. Alternately or additionally, knowledge associated with a particular application's behavior and code, including HTML, CSS, and Java-Script can be utilized to attempt to identify when a webpage is loaded. For example, an application's code may behave in a certain manner, e.g., by making certain calls or implementing certain routines, responsive to a webpage being fully loaded.

Figure 9:
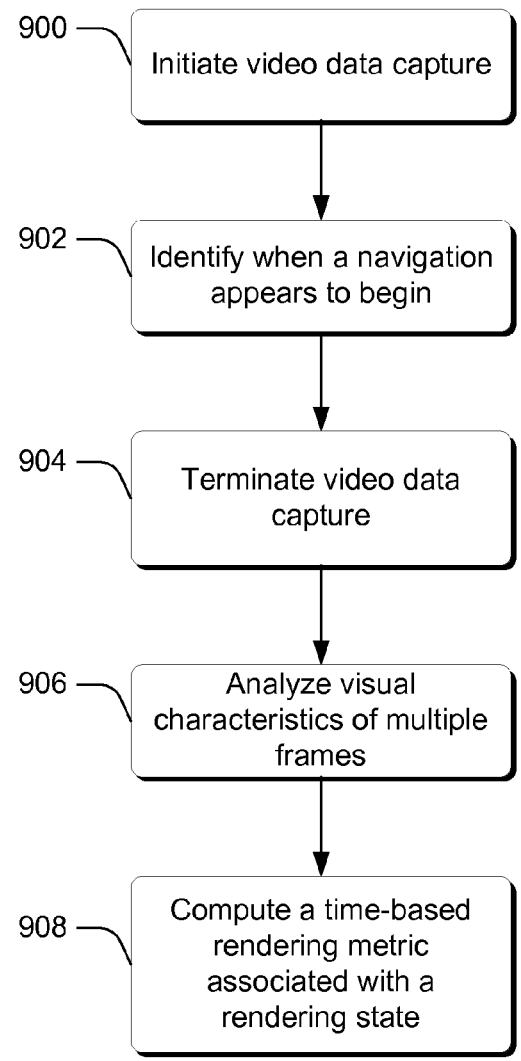
FIG. 9 is a flow diagram that describes steps in a method in accordance with one or more embodiments.

FIG. 9 is a flow diagram that describes steps in another method accordance with one or more embodiments. The method can be performed in connection with any suitable hardware, software, firmware, or combination thereof. In at least some embodiments, the method can be performed by software embodied on some type of computer-readable storage medium. One example of software that can perform the functionality about to be described includes a video capture component and image analysis component, such as that described above.

Step 900 initiates video data capture, on a display device, in association with a navigation to a webpage. This step can be performed in any suitable way, examples of which are provided above. For example, this step can be performed responsive to a user clicking a link to a particular webpage. Step 902 identifies when the associated navigation appears to begin. This step can be performed in any suitable way. For example, as noted above, this step can be performed by using a visual identifier on a screen of the display device. The visual identifier identifies when the navigation appears to begin. The visual identifier can be placed on the screen in response to detecting a click on a link to initiate navigation. Alternately, the visual identifier can be placed on the screen when a request is sent to request a webpage. Step 904 terminates video data capture effective to provide multiple frames of video data associated with the navigation. This step can be performed in any suitable way, examples of which are provided above. For example, in at least some embodiments, termination can occur at a predefined time. Alternately, termination can occur based on information associated with webpage content that is received such as, by way of example and not limitation, a last amount of received data such as a last received byte. Step 906 analyzes visual characteristics of multiple frames. This step can be performed in any suitable way. For example, analysis can take place on a frame-by-frame basis. Specifically, in at least some embodiments, a start frame can be designated and used as a baseline image for difference comparison of subsequent frames. The difference comparison can be conducted on a screen-basis, as by analyzing all of the content that visually appears on the screen. Alternately or additionally, the difference comparison can be conducted on a portion of an associated web page that constitutes less than an entirety of the webpage.

In at least some embodiments, analysis of the visual characteristics of the frames can include conducting pattern-based analysis of pixel changes within the frames. Based on analysis of the visual characteristics, step 908 computes a time-based rendering metric associated with a rendering state of at least a portion of the webpage. In some embodiments, the rendering state is a state associated with a fully rendered webpage. In other embodiments, the rendering state is a state associated with rendering of a sub-region of the webpage. In yet other embodiments, the rendering state can be associated with a partially rendered or incrementally rendered region. Analyzing incrementally rendered regions in terms of their associated time-based rendering metrics can be helpful in determining how to order page components for download to enhance the user's experience.

Having described example embodiments, consider now a discussion of an example device that can be utilized to implement the embodiments described above.

Example Device

Figure 10:
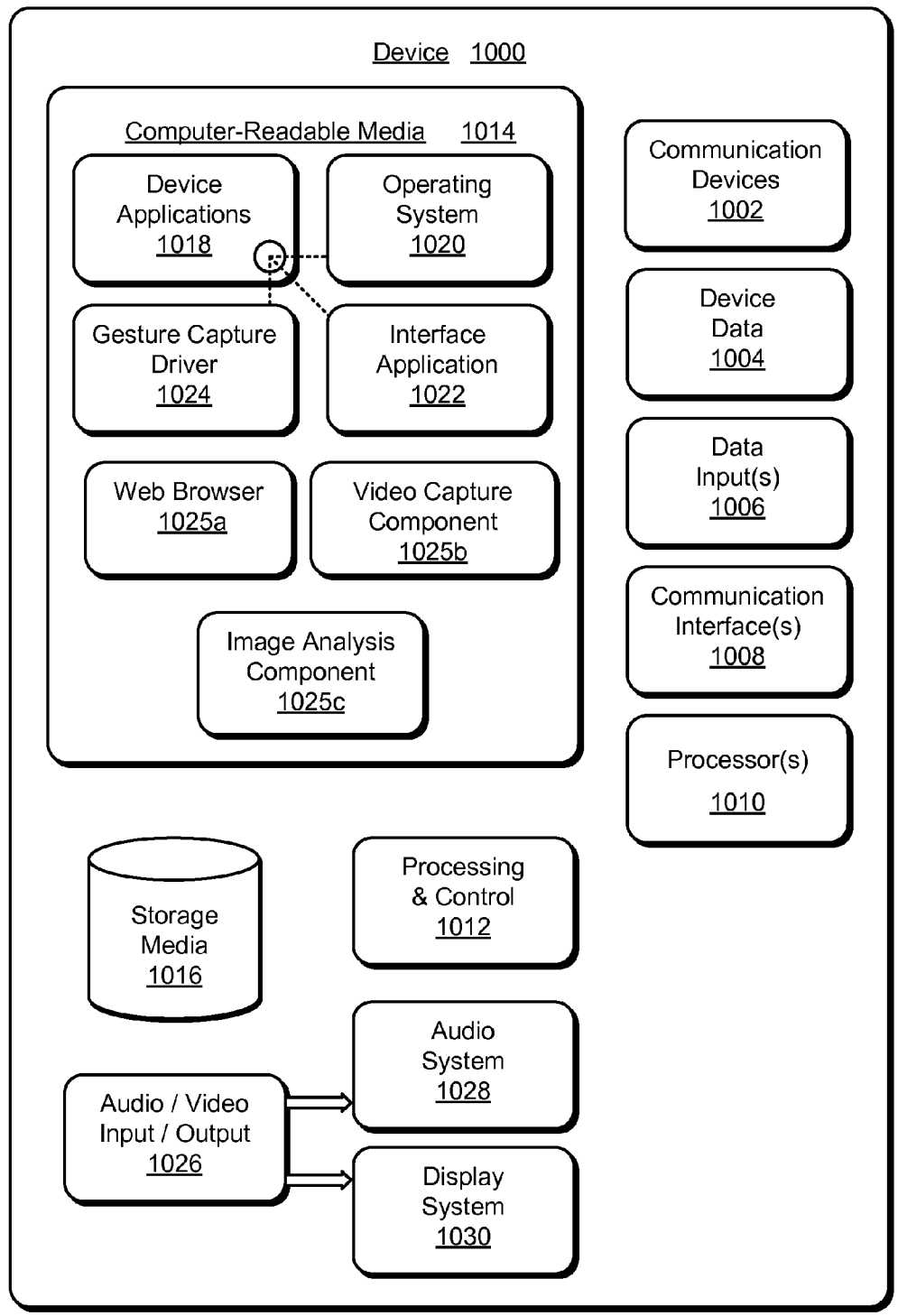
FIG. 10 illustrates an example computing device that can be utilized to implement various embodiments described herein.

FIG. 10 illustrates various components of an example device 1000 that can be implemented as any type of portable and/or computer device as described with reference to FIGS. 1 and 2 to implement the embodiments described herein. Device 1000 includes communication devices 1002 that enable wired and/or wireless communication of device data 1004 (e.g., received data, data that is being received, data scheduled for broadcast, data packets of the data, etc.). The device data 1004 or other device content can include configuration settings of the device, media content stored on the device, and/or information associated with a user of the device. Media content stored on device 1000 can include any type of audio, video, and/or image data. Device 1000 includes one or more data inputs 1006 via which any type of data, media content, and/or inputs can be received, such as user-selectable inputs, messages, music, television media content, recorded video content, and any other type of audio, video, and/or image data received from any content and/or data source.

Device 1000 also includes communication interfaces 1008 that can be implemented as any one or more of a serial and/or parallel interface, a wireless interface, any type of network interface, a modem, and as any other type of communication interface. The communication interfaces 1008 provide a connection and/or communication links between device 1000 and a communication network by which other electronic, computing, and communication devices communicate data with device 1000.

Device 1000 includes one or more processors 1010 (e.g., any of microprocessors, controllers, and the like) which process various computer-executable or readable instructions to control the operation of device 1000 and to implement the embodiments described above. Alternatively or in addition, device 1000 can be implemented with any one or combination of hardware, firmware, or fixed logic circuitry that is implemented in connection with processing and control circuits which are generally identified at 1012. Although not shown, device 1000 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

Device 1000 also includes computer-readable media 1014, such as one or more memory components, examples of which include random access memory (RAM), non-volatile memory (e.g., any one or more of a read-only memory (ROM), flash memory, EPROM, EEPROM, etc.), and a disk storage device. A disk storage device may be implemented as any type of magnetic or optical storage device, such as a hard disk drive, a recordable and/or rewriteable compact disc (CD), any type of a digital versatile disc (DVD), and the like. Device 1000 can also include a mass storage media device 1016.

Computer-readable media 1014 provides data storage mechanisms to store the device data 1004, as well as various device applications 1018 and any other types of information and/or data related to operational aspects of device 1000. For example, an operating system 1020 can be maintained as a computer application with the computer-readable media 1014 and executed on processors 1010. The device applications 1018 can include a device manager (e.g., a control application, software application, signal processing and control module, code that is native to a particular device, a hardware abstraction layer for a particular device, etc.), as well as other applications that can include, web browsers, image processing applications, communication applications such as instant messaging applications, word processing applications and a variety of other different applications. The device applications 1018 also include any system components or modules to implement embodiments of the techniques described herein. In this example, the device applications 1018 include an interface application 1022 and a gesture-capture driver 1024 that are shown as software modules and/or computer applications. The gesture-capture driver 1024 is representative of software that is used to provide an interface with a device configured to capture a gesture, such as a touchscreen, track pad, camera, and so on. Alternatively or in addition, the interface application 1022 and the gesture-capture driver 1024 can be implemented as hardware, software, firmware, or any combination thereof. In addition, computer readable media 1014 can include a web browser 1025a, video capture component 1025b, and an image analysis component 1025c that function as described above.

Device 1000 also includes an audio and/or video input-output system 1026 that provides audio data to an audio system 1028 and/or provides video data to a display system 1030. The audio system 1028 and/or the display system 1030 can include any devices that process, display, and/or otherwise render audio, video, and image data. Video signals and audio signals can be communicated from device 1000 to an audio device and/or to a display device via an RF (radio frequency) link, S-video link, composite video link, component video link, DVI (digital video interface), analog audio connection, or other similar communication link. In an embodiment, the audio system 1028 and/or the display system 1030 are implemented as external components to device 1000. Alternatively, the audio system 1028 and/or the display system 1030 are implemented as integrated components of example device 1000.

Conclusion

Various embodiments provide approaches for measuring the rendering times of a webpage that can be browser-independent. In at least some embodiments, as a web page is rendered, video data of the webpage is captured and analyzed to ascertain when the webpage has likely been completely rendered. In at least some embodiments, image processing can be performed on captured video data to ascertain, from observed pixel changes over time, when the webpage has likely been rendered.

In at least some embodiments, rendering times associated with an entire page can be ascertained through the described analysis techniques. Alternately or additionally, rendering times associated with sub-regions of a particular page can be ascertained through the described analysis techniques. In some instances, regions that are not of interest can be masked or ignored.

Although the embodiments have been described in language specific to structural features and/or methodological acts, it is to be understood that the embodiments defined in the appended claims are not necessarily limited to the specific features or acts described. Rather, the specific features and acts are disclosed as example forms of implementing the claimed embodiments.

What is claimed is:

1. A method comprising:
   capturing video data, the video data comprising a recording of a rendering of a webpage on a display device; and
   analyzing the video data sufficient to compute a time-based rendering metric associated with rendering at least a portion of the webpage wherein the time-based rendering metric comprises quantitative date relating to webpage load time.

2. The method of claim 1, wherein the time-based rendering metric is associated with an attempt to identify when the webpage is fully rendered.

3. The method of claim 1 further comprising analyzing system resource utilization and using analyzed system resource utilization and the time-based rendering metric to attempt to identify when said at least a portion of the webpage is rendered.

4. The method of claim 1 further comprising analyzing update frequency of the display device and graphics processor unit (GPU) and using analyzed update frequency and the time-based rendering metric to attempt to identify when said at least a portion of the webpage is rendered.

5. The method of claim 1 further comprising using the time-based rendering metric and knowledge about an application's behavior and code, including HTML, cascade style sheet (CSS) and JavaScript to attempt to identify when said at least a portion of the webpage is rendered.

6. The method of claim 1, wherein the time-based rendering metric is associated with an attempt to identify when the webpage is partially or fully rendered.

7. The method of claim 1, wherein said capturing video data comprises providing an identifier, associated with the video data, identifying when navigation to said webpage appears to begin, said identifier comprising a visual identifier.

8. The method of claim 1 further comprising terminating said capturing in accordance with one of the following: termination of a predefined time, or based on information associated with a last amount of received data.

9. The method of claim 1, wherein said analyzing comprises analyzing said video data on a frame-by-frame basis.

10. The method of claim 1, wherein said analyzing comprises analyzing said video data on a frame-by-frame basis by designating a start frame of the video data and using the start frame as a baseline image for difference comparison of subsequent frames.

11. The method of claim 1, wherein said analyzing comprises analyzing said video data on a frame-by-frame basis by designating a start frame of the video data and using the start frame as a baseline image for difference comparison of subsequent frames, said difference comparison being conducted on a screen-basis associated with the display device.

12. The method of claim 1, wherein said analyzing comprises analyzing said video data on a frame-by-frame basis by designating a start frame of the video data and using the start frame as a baseline image for difference comparison of subsequent frames, said difference comparison being conducted on a portion of the webpage constituting less than an entirety of the webpage.

13. One or more computer readable storage memories embodying computer-readable instructions which, when executed, implement a method comprising:
    initiating video data capture, on a display device, in association with a navigation to a webpage;
    identifying when the navigation appears to begin;
    terminating said video data capture effective to create a video, the video providing multiple frames of video data associated with the navigation;
    analyzing visual characteristics of the multiple frames; and
    based on said analyzing, computing a time-based rendering metric associated with a rendering state of at least a portion of the webpage.

14. The one or more computer readable storage memories of claim 13, wherein the rendering state comprises a state associated with a fully rendered webpage.

15. The one or more computer readable storage memories of claim 13, wherein said identifying comprises using a visual identifier on a screen of the display device.

16. The one or more computer readable storage memories of claim 13, wherein said analyzing visual characteristics comprises analyzing visual characteristics on a frame-by-frame basis by designating a start frame of the video data and using the start frame as a baseline image for difference comparison of subsequent frames.

17. The one or more computer readable storage memories of claim 13, wherein said analyzing visual characteristics comprises analyzing visual characteristics on a frame-by-frame basis by designating a start frame of the video data and using the start frame as a baseline image for difference comparison of subsequent frames, said difference comparison being conducted on a screen-basis.

18. The one or more computer readable storage memories of claim 13, wherein said analyzing visual characteristics comprises analyzing visual characteristics on a frame-by-frame basis by designating a start frame of the video data and using the start frame as a baseline image for difference comparison of subsequent frames, said difference comparison being conducted on a portion of the webpage constituting less than an entirety of the webpage.

19. The one or more computer readable storage memories of claim 13, wherein said analyzing visual characteristics comprises conducting pattern-based analysis of pixel changes within the frames effective to enable computation of the time-based rendering metric.

20. A system comprising:
    one or more processors;
    one or more computer-readable storage media;
    computer-readable instructions embodied on the one or more computer-readable storage media which, when executed, implement a method comprising:
        initiating video data capture, on a display device, the video data capture recording a navigation to a webpage;
        identifying when the navigation appears to begin by using a visual identifier on a screen of the display device;
        terminating said video data capture effective to provide multiple frames of video data associated with the navigation;
        analyzing, on a frame-by-frame basis, visual characteristics of the multiple frames by designating a start frame of the video data and using the start frame as a baseline image for difference comparison of subsequent frames; and
        based on said analyzing, computing a time-based rendering metric associated with a fully rendered state of at least a portion of the webpage,
    wherein the time-based rendering metric comprises quantitative data relating to webpage load time.

* * * * *